US012792955B2

(12) United States Patent
Cheng et al.

(10) Patent No.: US 12,792,955 B2
(45) **Date of Patent: *Nov. 10, 2026**

(54) SYSTEMS AND METHODS FOR USING MACHINE LEARNING MODELS TO ORGANIZE AND SELECT ACCESS-RESTRICTED COMPONENTS FOR USER INTERFACE TEMPLATES BASED ON CHARACTERISTICS OF ACCESS TOKEN TYPES

(71) Applicant: Capital One Services, LLC, McLean, VA (US)

(72) Inventors: Lin Ni Lisa Cheng, New York, NY (US); Purva Shanker, Arlington, VA (US); Sara Margaret Hughes, McLean, VA (US); Allison Trager, Demarest, NJ (US)

(73) Assignee: Capital One Services, LLC, McLean, VA (US)

( * ) Notice: Subject to any disclaimer, the term of this patent is extended or adjusted under 35 U.S.C. 154(b) by 1155 days.

This patent is subject to a terminal disclaimer.

(21) Appl. No.: 17/812,429

(22) Filed: Jul. 13, 2022

(65) Prior Publication Data

US 2024/0020570 A1 Jan. 18, 2024

(51) Int. Cl.
*G06N 20/00* (2019.01)

(52) U.S. Cl.
CPC .................................. *G06N 20/00* (2019.01)

(58) Field of Classification Search
CPC ........ G06N 20/00; G06N 3/045; G06N 3/084; G06N 3/094; G06N 3/0475; G06F 21/31; G06F 21/6245
See application file for complete search history.

(56) References Cited

U.S. PATENT DOCUMENTS 12,210,599 B2 * 1/2025 Cheng .................. G06F 21/316

* cited by examiner

*Primary Examiner* — Pei Yong Weng
(74) *Attorney, Agent, or Firm* — Foley & Lardner LLP

(57) ABSTRACT

Systems and methods for providing variable and temporary access to account content for a user in a secured manner through the use of an access token with variable properties are described. The systems and methods provide improved navigability to account content accessed via the access token through the customization of user interfaces. For example, the system and methods may generate user interface templates that comprise a recommended selection and organization of user input fields and/or user interface pages.

20 Claims, 6 Drawing Sheets

100

200

| | | |
|---|---|---|
| 202 | Token ID | CBXNDDD1 |
| 204 | User ID | 124342w1f |
| 206 | Account ID | 7824BCVD |
| 208 | Time Period | 1 Week |
| 210 | Privilege 1 | Pack_2 |
| 212 | Privilege 2 | Pack_3.1 |

FIG. 2

SYSTEMS AND METHODS FOR USING MACHINE LEARNING MODELS TO ORGANIZE AND SELECT ACCESS-RESTRICTED COMPONENTS FOR USER INTERFACE TEMPLATES BASED ON CHARACTERISTICS OF ACCESS TOKEN TYPES

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution to generate customized user interfaces for users.

SUMMARY

Systems and methods are described herein for novel uses and/or improvements to artificial intelligence applications. As one example, systems and methods are described herein for providing variable and temporary access to account content for a user in a secured manner through the use of an access token with variable properties. Additionally, or alternatively, the systems and methods provide improved navigability to account content accessed via the access token through the customization of user interfaces. For example, the system and methods may generate user interface templates that comprise a recommended selection and organization of user input fields and/or user interface pages.

Existing systems for the customization of user interfaces typically depend on a user manually selecting settings and/or preferences for user interface components and content. The systems and methods described herein improve upon these existing systems through an unconventional approach of automatically generating a recommended user interface template when a user accesses an account. One solution for achieving the recommended user interface template is to automatically generate recommended user interface templates based on the components, features, pages, and/or fields previously used by the user when accessing the account.

However, the implementation of this unconventional approach faces an initial technical hurdle when coupled with an access token with variable properties. For example, a primary use case for an access token with variable properties is to allow a user to temporarily access (or access with restricted privileges) an account of another user (e.g., as a more secure alternative to sharing passwords). In such a case, the user using the access token with the variable properties to access another user's account may have limited, if any, experience using the user interaction of the other user's account.

This creates a unique technical issue for adapting artificial intelligence models to generate recommended user interface templates as artificial intelligence models require an abundant amount of training data. Without this supply of training data, the artificial intelligence models cannot be properly trained.

To overcome these technical deficiencies in adapting artificial intelligence models for this practical benefit, systems and methods disclosed herein rely on an alternative data stream for training machine learning models to generate customized user interfaces for users. Specifically, the systems and methods may rely on training data describing how users use the access token as opposed to how users use user interfaces in the accounts. For example, the training data may comprise data on likely user behavior when using a specific access privilege (e.g., a privilege granted by an access token) to interact with user interfaces, data on how users typically use an access token of a given type, and/or what features or content users typically access when having an access token with a given set of characteristics (e.g., what privileges are granted, what users are granted privileges, what accounts do the privileges grant access to, and/or where and how long do the privileges last). For example, after determining how a given access token is typically used or how a specific user typically uses access token types (or access tokens with particular privileges), the system may organize and select the various components for a user interface template based on what accessible content matches the determined uses.

In some aspects, systems and methods for using machine learning models to organize and select access-restricted components for user interface templates based on characteristics of access token types are described. For example, the system may receive a request, from a user, to access a user interface of an account with a first access token, wherein the first access token comprises an access privilege and an access time period, wherein the access privilege indicates a privilege granted by the first access token with respect to the account, and wherein the access time period indicates a time period during which the first access token grants access to the account. The system may determine a token type of the first access token from a plurality of token types. The system may retrieve an access token profile based on the token type, wherein the access token profile includes a token use characteristic, and wherein the token use characteristic indicates likely uses of access tokens of the token type. The system may determine accessible content of the account based on the first access token. The system may generate a recommended user interface template for accessing the account with the first access token based on the token use characteristic using a machine learning model, wherein the machine learning model is trained to generate user interface templates for accessing the accessible content based on token use characteristics. The system may generate for display, on a user device, the user interface with the recommended user interface template in response to the user accessing the user interface with the first access token during the access time period.

In some aspects, systems and methods for using machine learning models to organize and select access-restricted components for user interface templates based on characteristics of access tokens with variable properties are described. For example, the system may receive a request, from a user, to access a user interface of an account with a first access token, wherein the first access token comprises an access privilege and an access time period, wherein the access privilege indicates a privilege granted by the first access token with respect to the account, and wherein the access time period indicates a time period during which the first access token grants access to the account. The system may retrieve a user profile corresponding to the user, wherein the user profile includes a user behavior characteristic, wherein the user behavior characteristic indicates likely user behavior when using the access privilege to interact with user interfaces. The system may determine accessible content of the account based on the first access token. The system may generate a recommended user interface template for accessing the account with the first access token based on the user behavior characteristic using a machine learning model, wherein the machine learning model is trained to generate user interface templates for accessing the accessible content based on user behavior characteristics. The system may generate for display, on a user device, the user interface with the recommended user interface template in response to the user accessing the user interface with the first access token during the access time period.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative diagram for an architecture of an access token with variable properties, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
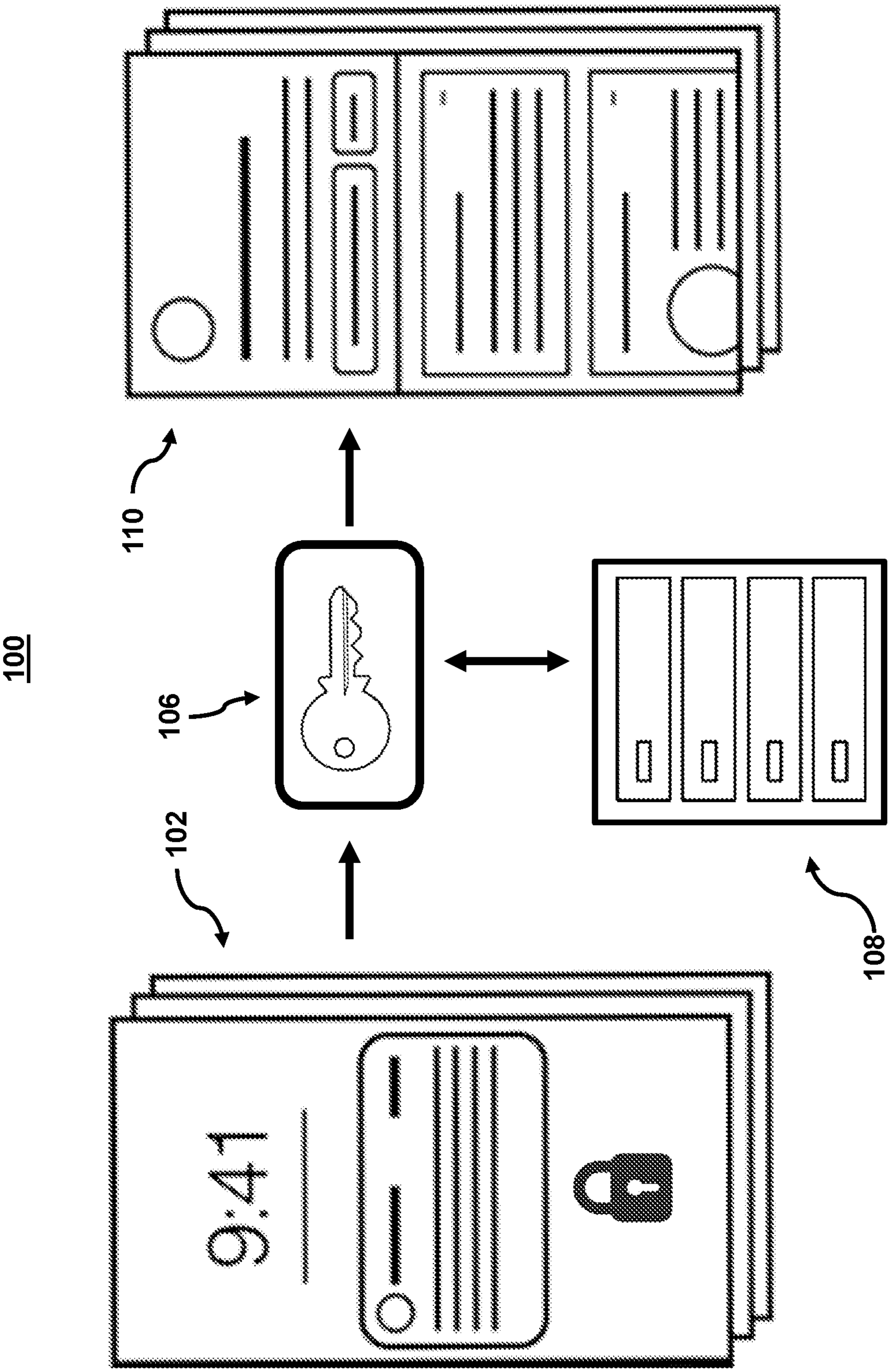
FIG. 1 shows an illustrative diagram for organizing and selecting access-restricted components for user interface templates, in accordance with one or more embodiments.

FIG. 1 shows an illustrative diagram for organizing and selecting access-restricted components for user interface templates, in accordance with one or more embodiments. For example, diagram 100 includes user interface 102 and user interface 110. As referred to herein, a "user interface" may comprise a human-computer interaction and communication in a device, and may include display screens, keyboards, a mouse, and the appearance of a desktop. For example, a user interface may comprise a way a user interacts with an application or a website.

As shown in FIG. 1, user interface 102 may represent a locked account (e.g., user interface 102 may be currently presenting a login-in screen) requesting user credentials and/or an access token. User interface 110 may represent an unlocked account (e.g., user interface 110 may be currently presenting account content). Account content may comprise any content accessible in or provided by an account. As described herein, an account may comprise any repository, record, or file (electronically stored or otherwise) that stores data and/or differentiates that data from other accounts.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

As shown in diagram 100, the system may unlock user interface 110 in response to the use of access token 106. Additionally, or alternatively, user interface 110 may comprise a plurality of access-restricted components that are presented in a recommended user interface template.

User interface 110 may include a first set of components. As described herein, a component may include any content, option, and/or functional capability provided to a user by software and/or hardware. For example, a component may include a distinctive attribute or aspect (e.g., performance, portability, and/or functionality) of the software and/or hardware. For example, in some embodiments, a component may be an available function of a program, operating system, and/or device. In some embodiments, the component may be provided as part of an application and/or may be provided as a plugin, applet, browser extension, and/or other software feature for an existing application. For example, the component may be part of an application and/or other program that may be toggled on or off. In another example, the component may be a software feature that may be added and/or removed from an application.

Each component may display particular content and/or content of a particular type. Alternatively, or additionally, each component may provide a given function. This function may be a locally performed function (e.g., a function performed on a local device) or this function may be a remotely-executed function. In some embodiments, a component may represent a link to additional information and/or other components, which may be accessed and/or available locally or remotely. In some embodiments, the component may be represented by textual and/or graphical content.

The system may include a component reference (e.g., metadata or other information that describes the component). For example, the component reference may include information about the purpose, functions, origin, system requirements (including required formats and/or capabilities), author, recommended use and/or user, related features (including features designated as complimentary, redundant, and/or incompatible). The component reference may include a description that may be expressed in a human and/or computer readable language. The component reference may also include a reference or pointer to user profile information, remote server (e.g., server 108) that may be relevant to the selection, and/or use of the component. The system may retrieve this content and/or compare it to the description in order to select and/or use the component. For example, the description may indicate that the component uses a particular format and/or displays data in a particular language. The system may retrieve information from a user profile that indicates a device format associated with the user and/or a language setting associated with the user. The system may then determine whether or not the retrieved information corresponds to the description.

In some embodiments, the components may be arranged as part of a user interface template. As referred to herein, the user interface template may comprise a selection and/or organization of one or more components. The user interface template may comprise a recommended selection and organization of user input fields and/or user interface pages. For example, one or more selected components and/or the organization of the one or more components may be expressed through one or more user input fields and/or user interface pages.

The system may select the user interface template (and/or the one or more components therein) based on data describing one or more users and/or access tokens. For example, the system may select the user interface template (and/or the one or more components therein) based on: likely user behavior when using a specific access privilege (e.g., a privilege granted by an access token) to interact with user interfaces; data on how users typically use an access token of a given type; and/or what features or content users typically access when having an access token with a given set of characteristics (e.g., what privileges are granted, what users are granted privileges, what accounts do the privileges grant access to, and/or where and how long do the privileges last).

In some embodiments, the system may use a machine learning model to select the user interface template (and/or the one or more components therein). For example, the system may train the machine learning model based on training data that comprises data on: likely user behavior when using a specific access privilege (e.g., a privilege granted by an access token) to interact with user interfaces; data on how users typically use an access token of a given type; and/or what features or content users typically access when having an access token with a given set of characteristics (e.g., what privileges are granted, what users are granted privileges, what accounts do the privileges grant access to, and/or where and how long do the privileges last).

The system may additionally, or alternatively, use user profile data to select the user interface template (or may train a machine learning model to make selections based on the user profile data). The user profile may be stored locally on a user device and/or remotely (e.g., at server 108). The user profile may include information about a user and/or device of a user. The information may be generated by actively and/or passively monitoring actions of the user. The user profile may also include information aggregated from one or more sources (including third party sources such as social media profiles, microservices, website cookies, data scraping, and/or other data aggregation). The information in the user profile may include personally identifiable information about a user and may be stored in a secure and/or encrypted manner. The information in the user profile may include information about user settings and/or preferences of the user, activity of the user, demographics of the user, and/or any other information used to target a feature towards a user and/or customize features for a user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring a person's identity and/or actions.

In some embodiments, the user profile may include a user behavior characteristic. For example, the user behavior characteristic may indicate likely user behavior when using the access privilege to interact with user interfaces. For example, the user behavior characteristic may indicate what content, components, input fields, pages, etc., are typically used by a user. The system may further organize this information based on the privileges granted to the user. For example, the system may use a user behavior characteristic to determine what behavior the user is likely to perform when using the access privilege to interact with user interfaces.

The system may additionally, or alternatively, use an access token profile to select the user interface template (or may train a machine learning model to make selections based on the user profile data). The access token profile may be stored locally on a user device and/or remotely (e.g., at server 108). The access token profile may include information about how users and/or devices use a given access token, type of access token, and/or a privilege of an access token. The information may be generated by actively and/or passively monitoring actions performed with one or more access tokens. The access token profile may also include information aggregated from one or more sources (including third party sources such as social media profiles, microservices, website cookies, data scraping, and/or other data aggregation).

The system may monitor content generated by the user to generate an access token profile. As referred to herein, "access token profile" may comprise data actively and/or passively collected about an access token, the use of an access token, and/or characteristics of the access token. For example, the access token profile may comprise token use characteristics. Furthermore, the access token profile may store different token use characteristics for different types of access tokens. As referred to herein, an access token type may comprise any category of access token. An access token type may comprise any characteristics (e.g., a token use characteristic) that distinguishes the access token type from another access token type. For example, different access token types may have different access privileges, user profile designations, account designations, and/or access time periods.

As referred to herein, a "token use characteristic" may include information about an access token and/or information included in a directory of stored token settings, privileges, and information about the access token. For example, the user behavior characteristic may indicate likely user behavior when using the access privilege to interact with user interfaces. For example, the user behavior characteristic may indicate what content, components, input fields, pages, etc., are typically used by a user. The system may further organize this information based on the privileges granted to the user. For example, the system may use a user behavior characteristic to determine what behavior the user is likely to perform when using the access privilege to interact with user interfaces.

For example, as shown in diagram 100, user interface 110 may include a first component. The first component and/or a user interface template featuring the component may be stored remotely (e.g., at server 108). The system may locate the first component and/or the user interface template based on a component and/or template reference. For example, the component and/or template may have been pre-fetched by the system prior to a user activating an application that generates the component for display. The system may prefetch this information based on information in the user profile (e.g., a user preference or setting), a predetermined or standard component selection (e.g., by the application), a previously selected component (e.g., a component that was present the last time the access token was used), and/or a real-time determination of feature registry 110. For example, feature registry 110 may continuously, and in real-time, update information about a user. The system may continuously pre-fetch this information and/or may push this information to a local user device and/or edge server for immediate use if an application is activated. Accordingly, the system may minimize delays attributed to populating user interface templates and/or providing components and information for components.

In some embodiments, the system may retrieve the component and/or template in response to a user providing an access token (e.g., to user interface 102). In some embodiments, the access token may comprise a storage address, wherein the storage address indicates a location (e.g., at server 108) of a recommended user interface template. For example, the storage address may comprise an address used to identify a file, record, domain, etc., corresponding to components and/or user interface templates corresponding to an access token.

For example, the system may select a component based on user insights and the features (e.g., related metadata) may be streamed to the mobile application prior to the user accessing the mobile application (e.g., at least while the user is logged out) such that the components are presented in the user's landing page (or other mobile app templated page) when the user logs into or otherwise accesses the mobile application. In another example, an application component may be removed or replaced with an alternative component based on the current availability status of the component (e.g., if a component is currently down, then a similar component is generated for display). In some embodiments, the component and the alternative component are streamed as an associated pair/set to the mobile application, and, if the component is detected to be down, the mobile app will show the alternative feature in its place.

In some embodiments, the system may select a component and/or a user interface template based on content that is accessible. For example, the system may determine accessible content of the account based on the first access token. The system may then filter the components and/or user interface templates based on what content is accessible.

For example, server 108 may comprise a centralized catalog where the system can provide user interface templates and/or add or configure components for toggling and throttling in the user interface templates. Server 108 may support metadata (e.g., descriptions of components), components that are being throttled and/or a level of throttling, remote/centralized configuration for the components, testing support and sandboxes for components, scheduled rollouts for components, and application versions for components. For example, the system may allow application providers to deliver applications, and updates to the applications, faster, and with confidence, while providing the ability to toggle and throttle components on and off at the user level. For example, server 108 may allow the system to filter through one or more user groups (and data about user groups and profiles), one or more applications (and application versions), plugin features (and versions of features). Server 108 may further configure the components and generate components for populating a user interface template.

Server 108 may also determine a selection and organization of user input fields and/or user interface pages corresponding to a component and/or a user interface template. Server 108 may receive requests for components and/or user interface templates. For example, a request may comprise an API request (or call) from one application (e.g., an application implemented on a local device) to an application on a server (e.g., server 108). The request may include one or more types of information that may be used by server 108 to respond to the request (e.g., recommended components, templates, inputs fields, pages, etc.). For example, the request may include information on a function and/or component that a user is requesting and/or likely to request (or use to access content), may include information on the user and/or user device, and/or may include information about other accessible content. In some embodiments, the system may use a machine learning model in order to respond to the request.

As referred to herein, an "account characteristic" may include any characteristic that indicates the status of one or more categories of a user account. For example, the account characteristic may include a value and/or presence of a value that may correspond to, or weigh on, a value corresponding to a template requirement for a user interface. For example, the system may parse account characteristics (or values in a user profile that may correspond to an account characteristic) to meet one or more template requirements. The system may then use this information to adjust the number of user input fields and/or number of user interface pages. For example, if a template has twenty different requirements, and ten may be satisfied by account characteristics from a user profile, the system may only generate ten user input fields (e.g., corresponding to the unsatisfied requirements).

The system may also use account characteristics from a user profile and/or access token profile to determine a recommended user interface template, component, input field, and/or page, including the arrangement and order thereof. For example, the system may determine that one or more categories of account characteristics are available from the user profile. Additionally, or alternatively, the system may determine that the presence of these account characteristics indicates that the user likely will access specific content (e.g., via a specific component). The system may organize the components of the user interface template to prioritize receiving information about these other characteristics. For example, if a template requirement requires a user to have current employment, but the user profile indicates that there is no current employer (or there is no current income), the system may prioritize verifying this information first (e.g., by generating a user input field corresponding to this category first).

For example, the system may identify a content characteristic for accessible content. As referred to herein, a "content characteristic" may comprise any of the more or less distinct parts into which the modular component may be divided, or from which the modular component is made up. For example, a content characteristic can be anything that may distinguish one content characteristic from another. In some embodiments, content characteristics may be human-readable text. For example, the content characteristic may be a keyword, an image, an embedded object, and/or other graphical characteristics. The system may search for and detect specific content based on content characteristics in order to generate recommendations, as well as select and organize components.

For example, the system may determine a number, shape, size, or other graphical characteristic for each component, input field, template, and/or page. For example, each page may include one or more page characteristics. As referred to herein, a page characteristic may include any characteristic that distinguishes one page from another. For example, the page characteristic may include the look or feel of a page, a number of user input fields, a size, font, space between fields, etc.

Additionally, the system may generate a content map for the template and/or component based on the parsing, wherein the content map indicates a position of the component within the template. For example, the content map may include each location of a given component with the distances and/or positions indicated. For example, the system may determine a Cascading Style Sheets ("CSS") position property for each characteristic. In another example, the system may use Hypertext Markup Language ("HTML") absolute positioning to define a content map. The system may then apply the content map to a page to generate the user interface template. The system may repeat this process for each page. Additionally, or alternatively, the system may repeat this process as user input is received, and/or a user input field and/or page is completed. For example, upon each input, completed page, etc., the system may transmit a request to server 108. Server 108 may then store the completed page, template, etc., for future use.

In some embodiments, the system may generate a feature input based on the content map, components, and/or other metadata, wherein the feature input comprises a vector array of values indicative of the content map, components, and/or other metadata. For example, the system may use a generative adversarial network, wherein the generative adversarial network is trained to generate outputs of recommended user interface templates that comprise selected and organized information. The component may then be arranged based on the content maps.

For example, a Certificated Public Accountants (CPA) may like to access and download statements from both business and individual clients on Jan. 2, 2022 to start preparing their tax filing. The CPA might see a list of current and past tokenization account access mapped with their client ID (or Nickname that CPA had setup). The system may allow for the accountant to select different actions, such as batch-downloading statements from all accounts that currently have validated access and/or require new token access, limited POA access, or evoke the token etc. In another example, when the CPA has a new business client grant the delegated user access, the smart user interface can bring her to alternative user interface flow to Bank A, B and C, instead of getting the CPA to go through typical user interface, which saves time. The CPA can also save the user interface flow in her profile as quick action under new account access, example: "Connect to QB", "Download CSV", etc.

FIG. 2 shows an illustrative diagram for an architecture of an access token with variable properties, in accordance with one or more embodiments. For example, FIG. 2 comprises access token profile 200. Access token profile 200 may comprise various information about an access token.

As referred to herein, an access token may comprise an object encapsulating the security identity of a process or thread. The access token may be used by the system (or an application) to make security decisions and to store tamper-proof information. Additionally, the access token may comprise variable properties that define the privileges and rights granted by the access token. For example, the access token may include additional free-form data that can be attached while the token is being created. The free-form data may include reference information, as well as indication of privileges.

In some embodiments, the access token may be generated by the system when a user logs on to the system and/or provides credentials that are authenticated against an authentication database. The authentication database may contain credential information required to construct the initial token for the logon session, including information recorded in an access token profile. As shown in access token profile 200, an access token profile may comprise various properties and information.

Access token profile 200 may comprise property 202. Property 202 may comprise a token identifier. For example, the token identifier may be used by the system to identify the access token and/or an access token profile corresponding to the access token. For example, the system may use the token identifier to retrieve information specific to an access token and/or an access token type.

Access token profile 200 may comprise property 204. Property 204 may comprise a user identifier. For example, the user identifier may be used by the system to identify the user and/or a user profile corresponding to the user. The user identifier may indicate a user profile designation. The user designation indicates a user granted the privilege.

Access token profile 200 may comprise property 206. Property 206 may comprise an account identifier. For example, the user account may be used by the system to identify the account to which the access token grants access. The account identifier may indicate an account designation. The account designation may identify the account to which the privilege is granted.

Access token profile 200 may comprise property 208. Property 208 may comprise a time period identifier. For example, the time period identifier may be used by the system to identify a time period during which the access token may be used. For example, the time period identifier may allow the system to grant only temporary access to an account. The first time period identifier may indicate an access time period. The access time period may indicate a time period during which the first access token grants access to the account.

Access token profile 200 may comprise property 210. Property 210 may comprise a first privilege identifier. For example, the first privilege identifier may be used by the system to identify a first privilege granted by the access token. The first privilege identifier may indicate a first access privilege. The first access privilege may indicate a first privilege granted by an access token with respect to an account.

Access token profile 200 may comprise property 212. Property 212 may comprise a second privilege identifier. For example, the second privilege identifier may be used by the system to identify a second privilege granted by the access token. The second privilege identifier may indicate a second access privilege. The second access privilege may indicate a second privilege granted by an access token with respect to an account.

Access token profile 200 may comprise property 214. Property 214 may comprise a type identifier. For example, the type identifier may be used by the system to identify a type of the access token. For example, the type of the access token may refer to a class of another token characteristic (e.g., a temporary access token, an access token with read/write rights, etc.).

Figure 3:
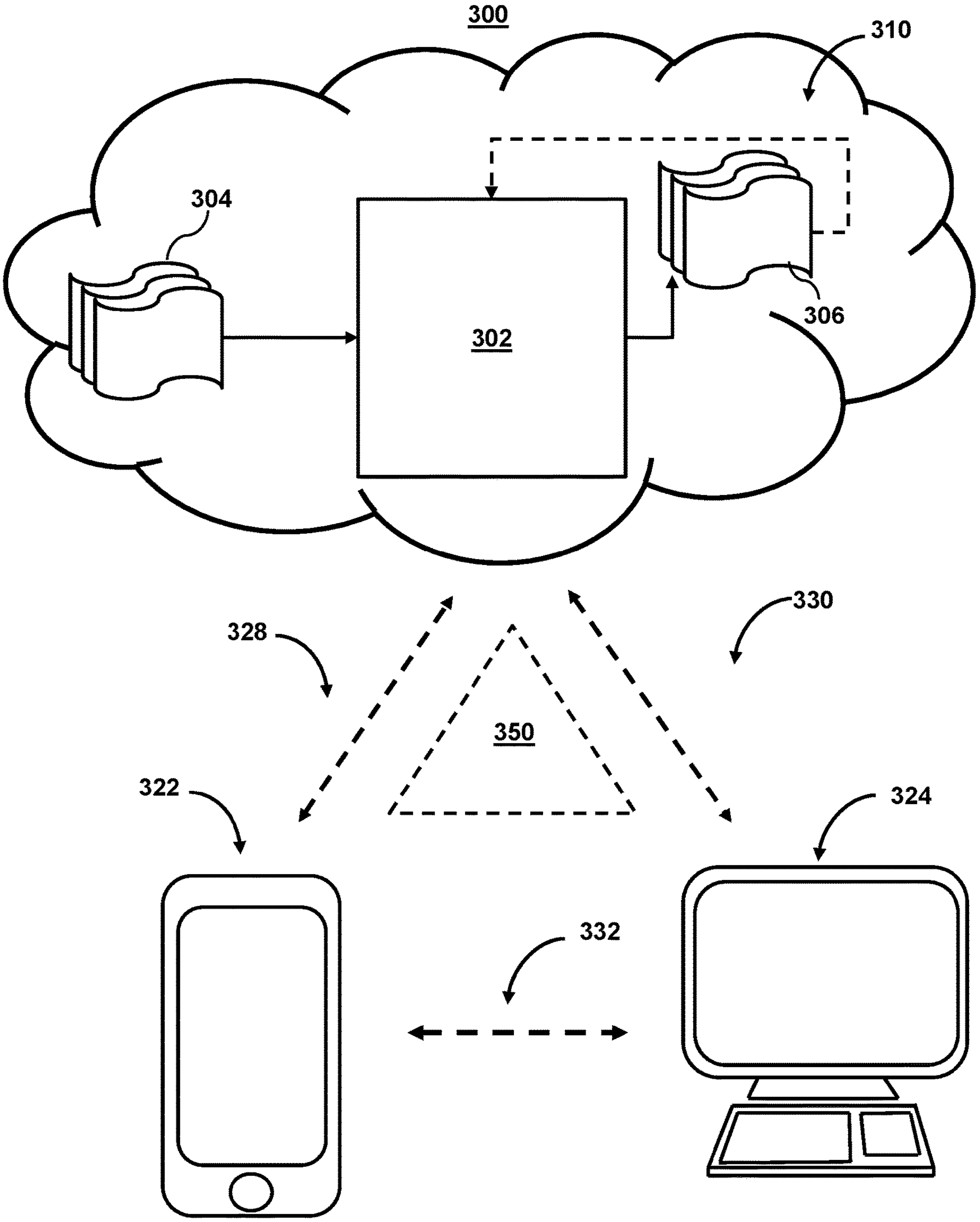
FIG. 3 shows illustrative components for a system used to organize and select access-restricted components for user interface templates, in accordance with one or more embodiments.

FIG. 3 shows illustrative components for a system used to organize and select access-restricted components for user interface templates, in accordance with one or more embodiments. For example, FIG. 3 may show illustrative components for organizing and selecting components for user interface templates. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., one or more components, user interface templates, input fields, user interface pages, graphical elements, and/or organization of (including the ordering of pages, fields and/or components)).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back-propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., one or more components, user interface templates, input fields, user interface pages, graphical elements, and/or organization of (including the ordering of pages, fields and/or components)).

In some embodiments, the model (e.g., model 302) may automatically perform actions based on outputs 306. In some embodiments, the model (e.g., model 302) may not perform any actions. The output of the model (e.g., model 302) may be used to recommend user interface templates and/or components as well as characteristics thereof.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
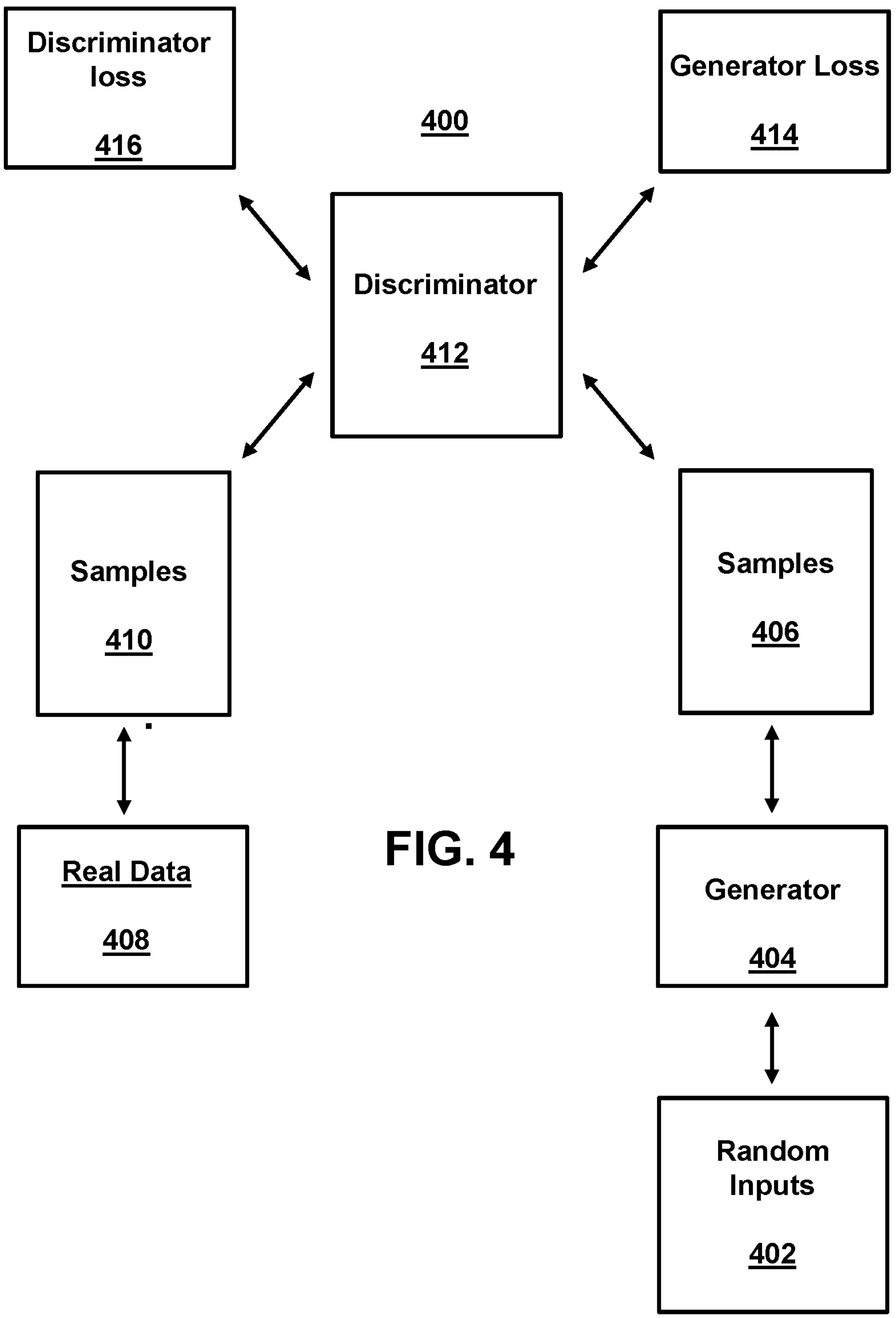
FIG. 4 shows an illustrative architecture of a machine learning model used to organize and select access-restricted components for user interface templates, in accordance with one or more embodiments.

FIG. 4 shows an illustrative architecture of a machine learning model used to organize and select access-restricted components for user interface templates, in accordance with one or more embodiments. The system may be trained to generate a recommended user interface template comprising a recommended selection and organization of user input fields and/or user interface pages. For example, the system may generate the preferred number of user input fields and/or the preferred number of user interface pages. For example, after determining how a given access token is typically used or how a specific user typically uses access token types (or access tokens with particular privileges), the system may organize and select the various components for a user interface template based on what accessible content matches the determined uses.

For example, FIG. 4 comprises system 400. System 400 may be used to generate recommended user interface templates with selected and organized components using generative adversarial networks implemented in an application programming interface layer. System 400, which may comprise a generative adversarial network, may include various templates, components, fields, and/or pages. For example, system 400 may include random inputs 402, which are fed into generator 404 to generate samples 406. Similarly, real data 408 may generate samples 410. Samples 406 and samples 410 may be fed into discriminator 412. Outputs from discriminator 412 may include discriminator loss 416 and generator loss 414. For example, after determining how a given access token is typically used or how a specific user typically uses access token types (or access tokens with particular privileges), the system may organize and select the various components (e.g., using determined content maps) for a user interface template based on what accessible content (e.g., based on content descriptions, references, and tags) matches the determined uses (e.g., as retrieved from a user profile, access token profile, etc.). In some embodiments, the system may also retrieve pre-rendered user interface templates that comprise a threshold number of characteristics based on a retrieved from a user profile, access token profile, etc.

For example, in system 400, both generator 404 and discriminator 412 may be neural networks. Generator 404 outputs may be connected directly to an input for discriminator 412. Through backpropagation, a classification from discriminator 412 provides a signal that generator 404 uses to update its weights. The backpropagation may comprise fine-tuning the weights used by system 400 (and/or generator 404 or discriminator 412) based on the error rate obtained in the previous epoch (i.e., iteration). Proper tuning of the weights allows system 400 to reduce error rates.

For example, generator 404 may generate new data instances (e.g., recommended user interface templates, components, order and/or organization). Discriminator 412 discriminates between different kinds of data instances. A generative adversarial network is a type of generative model. For example, given a set of data instances X and a set of labels Y, generator 404 may capture the joint probability p(X, Y), or just p(X) if there are no labels, whereas discriminator 412 captures the conditional probability p(Y|X).

Discriminator 412 may be a classifier that distinguishes real data (e.g., samples 410) from the data created by generator 404 (e.g., samples 406). For example, discriminator 412 may use samples 410 as positive examples during training. Discriminator 412 may use samples 410 as negative examples during training. In system 400, discriminator 412 connects to two loss functions (e.g., discriminator loss 416 and generator loss 414). During discriminator 412 training, discriminator 412 ignores generator loss 414, and uses discriminator loss 416.

During discriminator 412 training, discriminator 412 classifies both real data and fake data from generator 404. Discriminator loss 416 penalizes discriminator 412 for misclassifying a real instance (e.g., samples 210) as fake, or a fake instance (e.g., samples 206) as real. Discriminator 212 updates its weights through backpropagation from discriminator loss 216 through the discriminator network. Generator 404 of system 400 learns to create fake data by incorporating feedback from discriminator 412 (e.g., it learns to make discriminator 412 classify its output as real). In some embodiments, generator 404 training requires tighter integration between generator 404 and discriminator 412 than discriminator training requires. For example, system 400 trains generator 404 using random inputs 402.

As generator 404 improves with training, discriminator 412's performance gets worse because discriminator 412 cannot easily tell a difference between samples 410 and samples 406. If generator 404 succeeds, then discriminator 412 may have a 50% accuracy. Accordingly, generator 404 attempts to maximize generator loss 414.

It should be noted that additionally, or alternatively, the system may use variational autoencoders to generate content. For example, a variational autoencoder provides a probabilistic manner for describing an observation in latent space. As such, instead of using an encoder which outputs a single value to describe each latent state attribute, the system may determine a probability distribution for each latent attribute. To describe the observation in a probabilistic manner, the system determines a probability distribution for each latent attribute. During decoding from the latent state, the system randomly samples from each latent state distribution to generate a vector as input for the decoder. Accordingly, the variational autoencoder provides a model that outputs a range of possible values (e.g., a statistical distribution). These values can then be randomly sampled by the decoder. This creates a continuous, smooth latent space representation in which values that are nearby to one another in latent space create similar reconstructions.

Figure 5:
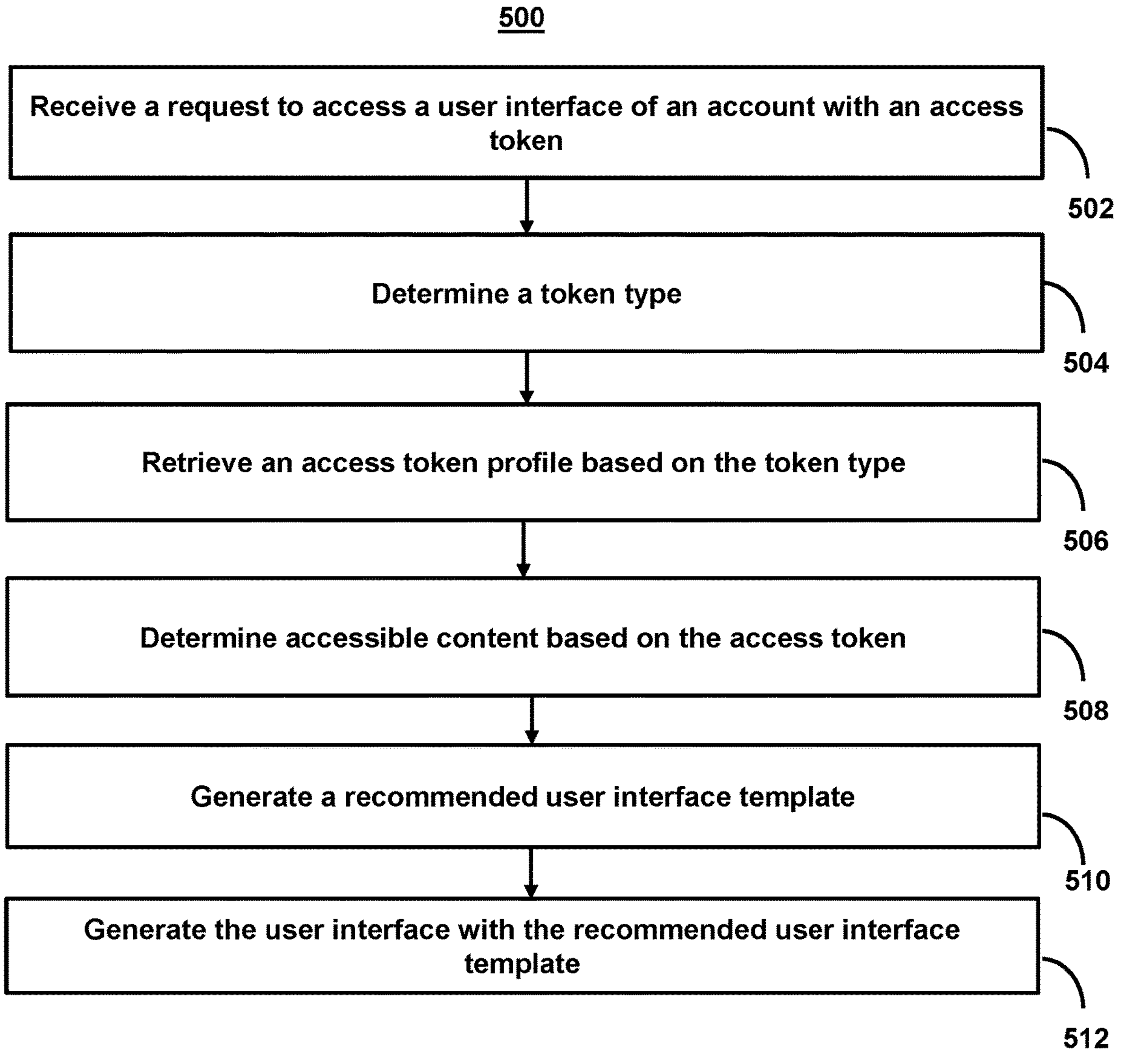
FIG. 5 shows a flowchart of the steps involved in using machine learning models to organize and select access-restricted components for user interface templates based on characteristics of access token types, in accordance with one or more embodiments.

FIG. 5 shows a flowchart of the steps involved in using machine learning models to organize and select access-restricted components for user interface templates based on characteristics of access token types, in accordance with one or more embodiments. For example, the system may use process 500 (e.g., as implemented on one or more system components described above) in order to use machine learning models to organize and select access-restricted components for user interface templates based on characteristics of access token types. In one practical application, financial institutions may offer their user "same or similar" digital experience based on their financial product. As delegated users that manage multiple accounts, different standard user flow from different financial institutions might become a burden. With the limited access role and rights as delegated users, users can operate many accounts from one financial institution or even in an aggregated manner from different institutions via different flows based on roles, user behaviors and different access rights.

At step 502, process 500 (e.g., using one or more components described above) receives a request to access a user interface of an account with an access token. For example, the system may receive a request, from a user, to access a user interface of an account with a first access token, wherein the first access token comprises an access privilege and an access time period, wherein the access privilege indicates a privilege granted by the first access token with respect to the account, and wherein the access time period indicates a time period during which the first access token grants access to the account. Additionally, or alternatively, the first access token may comprise a user profile designation and an account designation, wherein the user designation indicates that a user granted the privilege, and wherein the account designation identifies the account to which the privilege is granted.

In some embodiments, the system may generate an alert that an access time period for a first access token is nearing its end (or has ended). The system may further generate a recommendation to an account holder to allow the user to have a second access token created. The second access token may have another access time period. By doing so, the account holder may maintain control over the lifespan of the access token and/or the user's access to his/her account.

At step 504, process 500 (e.g., using one or more components described above) determines a token type. For example, the system may determine a token type of the first access token from a plurality of token types. For example, the system may perform different functions based on the type of access token.

At step 506, process 500 (e.g., using one or more components described above) receives an access token profile based on the token type. For example, the system may retrieve an access token profile based on the token type, wherein the access token profile includes a token use characteristic, and wherein the token use characteristic indicates likely uses of access tokens of the token type. In some embodiments, the system may combine the access token profile with a user profile. For example, the system may retrieve a user profile corresponding to the user, wherein the user profile includes a user behavior characteristic, wherein the user behavior characteristic indicates likely user behavior when using the access privilege to interact with user interfaces, wherein the recommended user interface template is further based on the user profile. For example, the system may retrieve a first additional user profile corresponding to the user from a third party microservice. The system may then retrieve a second additional user profile corresponding to the user from a website cookie. The system may then aggregate information from the access token profile, the first additional user profile, and the second additional user profile.

For example, user A is a parent that has a strong sense of environmental concern, with two children. One of the children is under 16 and the other is in college who might qualify for a college account. When user A signs up as a delegated user for her children having his own bank account, the platform offers user A a recommendation option, and gets consent to use user A social media account as one of the sources to provide an alternative UX path for user A. User A choice to use her social media account and grant the platform read only access for a certain period. Due to the metadata from social media accounts, the system is able to identify the environmental concern and have an alternative user interface path to how paperless and reward for carbon offset modular show up for user A at the first and second time she signed in. When there is a new product (a college account feature) offered by Bank B (where user A has an account), the system may alter the user interface template.

At step 508, process 500 (e.g., using one or more components described above) determines accessible content based on the access token. For example, the system may determine accessible content of the account based on the first access token. To do so, the system may filter available content based on the content that is accessible based on the privileges.

At step 510, process 500 (e.g., using one or more components described above) generates a recommended user interface template. For example, the system may generate a recommended user interface template for accessing the account with the first access token based on the token use characteristic using a machine learning model, wherein the machine learning model is trained to generate user interface templates for accessing the accessible content based on token use characteristics.

In some embodiments, the system may generate a first feature input based on the user profile and the accessible content. The system may then input the first feature input into the machine learning model. The system may receive from the machine learning model a first output, wherein the first output indicates the recommended user interface template. Additionally and alternatively, the system may receive, from the user, a user input into the user interface. The system may generate a second feature input based on the user input, the user profile, and the accessible content. The system may input the second feature input into the machine learning model. The system may receive from the machine learning model a second output. The system may update the recommended user interface template based on the second output.

For example, the recommended user interface template may comprise a recommended selection and organization of user input fields and/or user interface pages. In some embodiments, generating the recommended user interface template may comprise the system determining an input field the user likely accesses based on the token use characteristic and determining a user interface page the user likely accesses based on token use characteristic.

Additionally, or alternatively, the system may generate various probabilities. For example, the system may determine a respective probability that the user accesses an input field based on the token use characteristic. The system may compare the respective probability to a threshold probability. The system may determine to include the input field in the recommended user interface template based on the respective probability exceeding the threshold probability. In some embodiments, the system may determine a respective probability of an order in which the user accesses a plurality of user interface pages based on the token use characteristic. The system may compare the respective probability to a threshold probability. The system may generate the recommended user interface template based on the order.

At step 512, process 500 (e.g., using one or more components described above) generates the user interface with the recommended user interface template. For example, the system may generate for display, on a user device, the user interface with the recommended user interface template in response to the user accessing the user interface with the first access token during the access time period. In some embodiments, the system may retrieve the recommended user interface template from a remote location. For example, the system may retrieve a storage address from the first access token, wherein the storage address indicates a location of the recommended user interface template. The system may then store the recommended user interface template at the storage address, wherein the storage address is called in response to the user accessing the account with the first access token.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
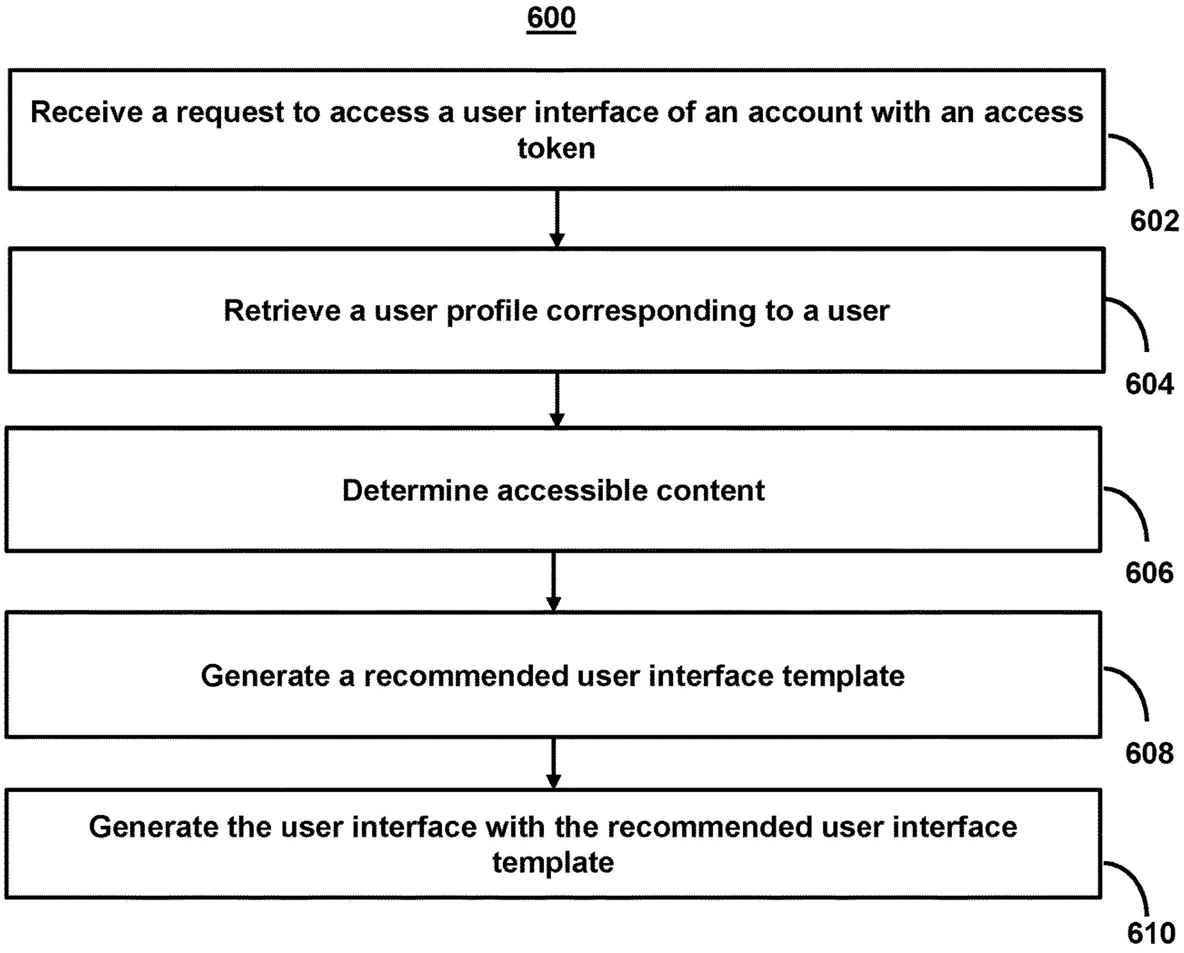
FIG. 6 shows a flowchart of the steps involved in using machine learning models to organize and select access-restricted components for user interface templates based on characteristics of access tokens with variable properties, in accordance with one or more embodiments.

FIG. 6 shows a flowchart of the steps involved in using machine learning models to organize and select access-restricted components for user interface templates based on characteristics of access tokens with variable properties, in accordance with one or more embodiments. For example, the system may use process 400 (e.g., as implemented on one or more system components described above) in order to use machine learning models to organize and select access-restricted components for user interface templates based on characteristics of access tokens with variable properties.

At step 602, process 600 (e.g., using one or more components described above) receives a request to access a user interface of an account with an access token. For example, the system may receive a request, from a user, to access a user interface of an account with a first access token, wherein the first access token comprises an access privilege and an access time period, wherein the access privilege indicates a privilege granted by the first access token with respect to the account, and wherein the access time period indicates a time period during which the first access token grants access to the account. For example, the recommended user interface template comprises a recommended selection and organization of user input fields and/or user interface pages. Additionally, or alternatively, the first access token may comprise a user profile designation and an account designation, wherein the user designation indicates a user granted the privilege, and wherein the account designation identifies the account to which the privilege is granted.

At step 604, process 600 (e.g., using one or more components described above) retrieves a user profile corresponding to a user. For example, the system may retrieve a user profile corresponding to the user, wherein the user profile includes a user behavior characteristic, wherein the user behavior characteristic indicates likely user behavior when using the access privilege to interact with user interfaces.

In some embodiments, the system may combine the user profile with other information. For example, the system may retrieve a first additional user profile corresponding to the user from a third party microservice. The system may retrieve a second additional user profile corresponding to the user from a website cookie. The system may then aggregate information from the user profile, the first additional user profile, and the second additional user profile. Additionally, or alternatively, the system may combine the user profile with additional information such as an access token profile. For example, the system may retrieve an access token profile for the first access token, wherein the access token profile includes a token use characteristic, wherein the token use characteristic indicates likely uses of access tokens of given token types, and wherein the recommended user interface template is further based on the user profile.

At step 606, process 600 (e.g., using one or more components described above) determines accessible content. For example, the system may determine accessible content of the account based on the first access token. To do so, the system may filter available content based on the content that is accessible based on the privileges.

At step 608, process 600 (e.g., using one or more components described above) generates a recommended user interface template. For example, the system may generate a recommended user interface template for accessing the account with the first access token based on the user behavior characteristic using a machine learning model, wherein the machine learning model is trained to generate user interface templates for accessing the accessible content based on user behavior characteristics.

In some embodiments, the system may generate a first feature input based on the user profile and the accessible content. The system may input the first feature input into the machine learning model. The system may receive from the machine learning model a first output, wherein the first output indicates the recommended user interface template. Additionally, or alternatively, the system may receive, from the user, a user input into the user interface. The system may generate a second feature input based on the user input, the user profile, and the accessible content. The system may input the second feature input into the machine learning model. The system may receive from the machine learning model a second output. The system may update the recommended user interface template based on the second output.

Additionally, or alternatively, the system may generate various probabilities. For example, the system may determine a respective probability that the user accesses an input field based on the user behavior characteristic. The system may compare the respective probability to a threshold probability. The system may determine to include the input field in the recommended user interface template based on the respective probability exceeding the threshold probability. In some embodiments, the system may determine a respective probability of an order in which the user accesses a plurality of user interface pages based on the user behavior characteristic. The system may compare the respective probability to a threshold probability. The system may generate the recommended user interface template based on the order.

At step 610, process 600 (e.g., using one or more components described above) generates the user interface with the recommended user interface template. For example, the system may generate for display, on a user device, the user interface with the recommended user interface template in response to the user accessing the user interface with the first access token during the access time period. For example, the system may determine an input field the user likely accesses based on the user behavior characteristic. The system may then determine a user interface page the user likely accesses based on the user behavior characteristic.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a request, from a user, to access a user interface of an account with a first access token, wherein the first access token comprises an access privilege and an access time period, wherein the access privilege indicates a privilege granted by the first access token with respect to the account, and wherein the access time period indicates a time period during which the first access token grants access to the account; determining a token type of the first access token from a plurality of token types; retrieving an access token profile based on the token type, wherein the access token profile includes a token use characteristic, and wherein the token use characteristic indicates likely uses of access tokens of the token type; determining accessible content of the account based on the first access token; generating a recommended user interface template for accessing the account with the first access token based on the token use characteristic using a machine learning model, wherein the machine learning model is trained to generate user interface templates for accessing the accessible content based on token use characteristics; and generating for display, on a user device, the user interface with the recommended user interface template in response to the user accessing the user interface with the first access token during the access time period.
2. The method of the preceding embodiment, wherein the method is for using machine learning models to organize and select access-restricted components for user interface templates based on characteristics of access token types.
3. The method of any one of the preceding embodiments, wherein the recommended user interface template comprises a recommended selection and organization of user input fields and/or user interface pages.
4. The method of any one of the preceding embodiments, wherein the first access token comprises a user profile designation and an account designation, wherein the user designation indicates a user granted the privilege, and wherein the account designation identifies the account to which the privilege is granted.
5. The method of any one of the preceding embodiments, further comprising: generating a first feature input based on the user profile and the accessible content; inputting the first feature input into the machine learning model; and receiving from the machine learning model a first output, wherein the first output indicates the recommended user interface template.
6. The method of any one of the preceding embodiments, further comprising: receiving, from the user, a user input into the user interface; generating a second feature input based on the user input, the user profile, and the accessible content; inputting the second feature input into the machine learning model; receiving from the machine learning model a second output; and updating the recommended user interface template based on the second output.
7. The method of any one of the preceding embodiments, wherein generating the recommended user interface template comprises: determining an input field the user likely accesses based on the token use characteristic; and determining a user interface page the user likely accesses based on token use characteristic.
8. The method of any one of the preceding embodiments, wherein generating the recommended user interface template comprises: determining a respective probability that the user accesses an input field of based on the token use characteristic; comparing the respective probability to a threshold probability; and determining to include the input field in the recommended user interface template based on the respective probability exceeding the threshold probability.
9. The method of any one of the preceding embodiments, further comprising: determining a respective probability of an order in which the user accesses a plurality of user interface pages based on the token use characteristic; comparing the respective probability to a threshold probability; and generating the recommended user interface template based on the order.
10. The method of any one of the preceding embodiments, further comprising: retrieving a storage address from the first access token, wherein the storage address indicates a location of the recommended user interface template; and storing the recommended user interface template at the storage address, wherein the storage address is called in response to the user accessing the account with the first access token.
11. The method of any one of the preceding embodiments, further comprising: retrieving a first additional user profile corresponding to the user from a third party microservice; retrieving a second additional user profile corresponding to the user from a website cookie; and aggregating information from the user profile, the first additional user profile, and the second additional user profile.
12. The method of any one of the preceding embodiments, further comprising: retrieving a user profile corresponding to the user, wherein the user profile includes a user behavior characteristic, wherein the user behavior characteristic indicates likely user behavior when using the access privilege to interact with user interfaces, wherein the recommended user interface template is further based on the user profile.
13. A method, the method comprising: receiving a request, from a user, to access a user interface of an account with a first access token, wherein the first access token comprises an access privilege and an access time period, wherein the access privilege indicates a privilege granted by the first access token with respect to the account, and wherein the access time period indicates a time period during which the first access token grants access to the account; retrieving a user profile corresponding to the user, wherein the user profile includes a user behavior characteristic, wherein the user behavior characteristic indicates likely user behavior when using the access privilege to interact with user interfaces; determining accessible content of the account based on the first access token; generating a recommended user interface template for accessing the account with the first access token based on the user behavior characteristic using a machine learning model, wherein the machine learning model is trained to generate user interface templates for accessing the accessible content based on user behavior characteristics; and generating for display, on a user device, the user interface with the recommended user interface template in response to the user accessing the user interface with the first access token during the access time period.

14. The method of the preceding embodiment, wherein the method is for using machine learning models to organize and select access-restricted components for user interface templates based on characteristics of access tokens with variable properties.

15. The method of any one of the preceding embodiments, wherein the recommended user interface template comprises a recommended selection and organization of user input fields and/or user interface pages.

16. The method of any one of the preceding embodiments, wherein the first access token comprises a user profile designation and an account designation, wherein the user designation indicates a user granted the privilege, and wherein the account designation identifies the account to which the privilege is granted.

17. The method of any one of the preceding embodiments, further comprising: generating a first feature input based on the user profile and the accessible content; inputting the first feature input into the machine learning model; and receiving from the machine learning model a first output, wherein the first output indicates the recommended user interface template.

18. The method of any one of the preceding embodiments, further comprising: receiving, from the user, a user input into the user interface; generating a second feature input based on the user input, the user profile, and the accessible content; inputting the second feature input into the machine learning model; receiving from the machine learning model a second output; and updating the recommended user interface template based on the second output.

19. The method of any one of the preceding embodiments, wherein generating the recommended user interface template comprises: determining an input field the user likely accesses based on the user behavior characteristic; and determining a user interface page the user likely accesses based on the user behavior characteristic.

20. The method of any one of the preceding embodiments, wherein generating the recommended user interface template comprises: determining a respective probability that the user accesses an input field of based on the user behavior characteristic; comparing the respective probability to a threshold probability; and determining to include the input field in the recommended user interface template based on the respective probability exceeding the threshold probability.

21. The method of any one of the preceding embodiments, further comprising: determining a respective probability of an order in which the user accesses a plurality of user interface pages based on the user behavior characteristic; comparing the respective probability to a threshold probability; and generating the recommended user interface template based on the order.

22. The method of any one of the preceding embodiments, further comprising: retrieving a storage address from the first access token, wherein the storage address indicates a location of the recommended user interface template; and storing the recommended user interface template at the storage address, wherein the storage address is called in response to the user accessing the account with the first access token.

23. The method of any one of the preceding embodiments, further comprising: retrieving a first additional user profile corresponding to the user from a third party microservice; retrieving a second additional user profile corresponding to the user from a website cookie; and aggregating information from the user profile, the first additional user profile, and the second additional user profile.

24. The method of any one of the preceding embodiments, further comprising: retrieving an access token profile for the first access token, wherein the access token profile includes a token use characteristic, wherein the token use characteristic indicates likely uses of access tokens of given token types, and wherein the recommended user interface template is further based on the user profile.

25. A tangible, non-transitory, machine-readable medium storing instructions that, when executed by a data processing apparatus, cause the data processing apparatus to perform operations comprising those of any of embodiments 1-24.

26. A system comprising one or more processors; and memory storing instructions that, when executed by the processors, cause the processors to effectuate operations comprising those of any of embodiments 1-25.

27. A system comprising means for performing any of embodiments 1-26.

What is claimed is:

1. A system for using machine learning models to organize and select access-restricted components for user interface templates based on characteristics of access token types, the system comprising:

cloud-based storage circuitry for:

storing a plurality of access token profiles; and a machine learning model, wherein the machine learning model is trained to generate one or more user interface templates for accessing account content based on token use characteristics;

cloud-based control circuitry for:

receiving a request to access a user interface of an account with a first access token, wherein the first access token comprises an access privilege, a user profile designation, an account designation, and an access time period, wherein the access privilege indicates a privilege granted by the first access token for the account, wherein a user designation indicates a user to which the privilege is granted, wherein the account designation identifies the account for which the privilege is granted, and wherein the access time period indicates a time period during which the first access token grants access to the user for the account;

determining a token type of the first access token from a plurality of token types;

retrieving an access token profile from the plurality of access token profiles based on the token type, wherein the access token profile includes at least one of a token use characteristic indicating a likely use of access tokens of the token type;

determining accessible content of the account based on the first access token;

generating a first feature input based on the token use characteristic and the accessible content;

inputting the first feature input into the machine learning model; and receiving from the machine learning model a first output, wherein the first output indicates a recommended user interface template for accessing the account with the first access token, and wherein the recommended user interface template comprises a recommended selection and organization of user input fields and/or user interface pages; and cloud-based input/output circuitry for generating for display, on a user device, the user interface with the recommended user interface template in response to the user accessing the user interface with the first access token during the access time period.

2. A method for using machine learning models to organize and select access-restricted components for one or more user interface templates, the method comprising:

receiving a request, from a user, to access a user interface of an account with a first access token, wherein the first access token comprises an access privilege and an access time period, wherein the access privilege indicates a privilege granted by the first access token for the account, and wherein the access time period indicates a time period during which the first access token grants access to the account;

determining a token type of the first access token from a plurality of token types;

retrieving an access token profile based on the token type, wherein the access token profile includes a token use characteristic indicating a likely uses of access tokens of the token type;

determining accessible content of the account based on the first access token;

generating a recommended user interface template for accessing the account with the first access token based on the token use characteristic using a machine learning model, wherein the machine learning model is trained to generate user interface templates for accessing the accessible content based on token use characteristics; and generating for display, on a user device, the user interface with the recommended user interface template in response to the user accessing the user interface with the first access token during the access time period.

3. The method of claim 2, wherein the recommended user interface template comprises a recommended selection and organization of user input fields and/or user interface pages.

4. The method of claim 2, wherein the first access token comprises a user profile designation and an account designation, wherein the user profile designation indicates the user is granted the privilege, and wherein the account designation identifies the account to which the privilege is granted.

5. The method of claim 2, further comprising:

generating a first feature input based on a user profile and the accessible content;

inputting the first feature input into the machine learning model; and receiving from the machine learning model a first output, wherein the first output indicates the recommended user interface template.

6. The method of claim 5, further comprising:

receiving, from the user, a user input into the user interface;

generating a second feature input based on the user input, the user profile, and the accessible content;

inputting the second feature input into the machine learning model;

receiving from the machine learning model a second output; and updating the recommended user interface template based on the second output.

7. The method of claim 2, wherein generating the recommended user interface template comprises:

determining an input field the user likely accesses based on the token use characteristic; and determining a user interface page the user likely accesses based on the token use characteristic.

8. The method of claim 2, wherein generating the recommended user interface template comprises:

determining a respective probability that the user accesses an input field based on the token use characteristic;

comparing the respective probability to a threshold probability; and determining to include the input field in the recommended user interface template based on the respective probability exceeding the threshold probability.

9. The method of claim 2, further comprising:

determining a respective probability of an order in which the user accesses a plurality of user interface pages based on the token use characteristic;

comparing the respective probability to a threshold probability; and generating the recommended user interface template based on the order.

10. The method of claim 2, further comprising:

retrieving a storage address from the first access token, wherein the storage address indicates a location of the recommended user interface template; and storing the recommended user interface template at the storage address, wherein the storage address is called in response to the user accessing the account with the first access token.

11. The method of claim 2, further comprising:

retrieving a first additional user profile corresponding to the user from a third party microservice;

retrieving a second additional user profile corresponding to the user from a website cookie; and aggregating information from a user profile, the first additional user profile, and the second additional user profile.

12. The method of claim 2, further comprising:

retrieving a user profile corresponding to the user, wherein the user profile includes a user behavior characteristic, wherein the user behavior characteristic indicates likely user behavior when using the access privilege to interact with user interfaces, wherein the recommended user interface template is further based on the user profile.

13. A non-transitory, computer readable medium comprising instructions that when executed on one or more processors cause operations comprising:

receiving a request, from a user, to access a user interface of an account with a first access token, wherein the first access token comprises an access privilege and an access time period, wherein the access privilege indicates a privilege granted by the first access token for the account, and wherein the access time period indicates a time period during which the first access token grants access to the account;

determining a token type of the first access token from a plurality of token types;

retrieving an access token profile based on the token type, wherein the access token profile includes a token use characteristic indicating a likely uses of access tokens of the token type;

determining accessible content of the account based on the first access token;

generating a recommended user interface template for accessing the account with the first access token based on the token use characteristic using a machine learning model, wherein the machine learning model is trained to generate one or more user interface templates for accessing the accessible content based on token use characteristics; and generating for display, on a user device, the user interface with the recommended user interface template in response to the user accessing the user interface with the first access token during the access time period.

14. The non-transitory, computer readable medium of claim 13, wherein the instructions further cause operations comprising:

determining a respective probability of an order in which the user accesses a plurality of user interface pages based on the token use characteristic;

comparing the respective probability to a threshold probability; and generating the recommended user interface template based on the order.

15. The non-transitory, computer readable medium of claim 13, wherein the recommended user interface template comprises a recommended selection and organization of user input fields and/or user interface pages.

16. The non-transitory, computer readable medium of claim 13, wherein the instructions further cause operations comprising:

retrieving a storage address from the first access token, wherein the storage address indicates a location of the recommended user interface template; and storing the recommended user interface template at the storage address, wherein the storage address is called in response to the user accessing the account with the first access token.

17. The non-transitory, computer readable medium of claim 13, wherein the instructions further cause operations comprising:

retrieving a first additional user profile corresponding to the user from a third party microservice;

retrieving a second additional user profile corresponding to the user from a website cookie; and aggregating information from a user profile, the first additional user profile, and the second additional user profile.

18. The non-transitory, computer readable medium of claim 13, further comprising:

retrieving a user profile corresponding to the user, wherein the user profile includes a user behavior characteristic, wherein the user behavior characteristic indicates likely user behavior when using the access privilege to interact with user interfaces, wherein the recommended user interface template is further based on the user profile.

19. The non-transitory, computer readable medium of claim 13, wherein generating the recommended user interface template comprises:

determining an input field the user likely accesses based on the token use characteristic; and determining a user interface page the user likely accesses based on the token use characteristic.

20. The non-transitory, computer readable medium of claim 13, wherein generating the recommended user interface template comprises:

determining a respective probability that the user accesses an input field based on the token use characteristic;

comparing the respective probability to a threshold probability; and determining to include the input field in the recommended user interface template based on the respective probability exceeding the threshold probability.

* * * * *